US010850454B2

(12) United States Patent
Ahn et al.

(10) Patent No.: US 10,850,454 B2
(45) Date of Patent: Dec. 1, 2020

(54) POROUS SINGLE RESIN FIBER COMPOSITE MATERIAL AND METHOD FOR MANUFACTURING POROUS SINGLE RESIN FIBER COMPOSITE MATERIAL

(71) Applicants: LG Hausys, Ltd., Seoul (KR); ENVIONEER Co., Ltd., Seongnam-si (KR)

(72) Inventors: Seung-Hyun Ahn, Anyang-si (KR); Kyung-Seok Han, Anyang-si (KR); Seong-Moon Jung, Daejeon (KR)

(73) Assignees: LG HAUSYS, LTD., Seoul (KR); ENVIONEER CO., LTD., Seongnam-si (KR)

( * ) Notice: Subject to any disclaimer, the term of this patent is extended or adjusted under 35 U.S.C. 154(b) by 89 days.

(21) Appl. No.: 15/770,029

(22) PCT Filed: Oct. 21, 2016

(86) PCT No.: PCT/KR2016/011895
§ 371 (c)(1),
(2) Date: Apr. 20, 2018

(87) PCT Pub. No.: WO2017/069558
PCT Pub. Date: Apr. 27, 2017

(65) Prior Publication Data
US 2018/0304555 A1      Oct. 25, 2018

(30) Foreign Application Priority Data

Oct. 23, 2015   (KR) .................. 10-2015-0148292

(51) Int. Cl.
  *B29C 70/02*   (2006.01)
  *B29C 70/10*   (2006.01)
  (Continued)

(52) U.S. Cl.
  CPC .............. *B29C 70/02* (2013.01); *B29C 70/04* (2013.01); *B29C 70/08* (2013.01); *B29C 70/10* (2013.01);
  (Continued)

(58) Field of Classification Search
  CPC .. D21H 5/10; D21H 13/24; C08J 5/046; C08J 5/048; C08J 2367/02
  See application file for complete search history.

(56) References Cited

U.S. PATENT DOCUMENTS

| 5,723,209 A * | 3/1998 | Borger .................. F16L 59/026 428/219 |
| 2010/0133173 A1* | 6/2010 | Inagaki .............. B01D 39/1623 210/504 |
| 2014/0311695 A1 | 10/2014 | Clark et al. |

FOREIGN PATENT DOCUMENTS

| JP | H05214653 A | 8/1993 |
| JP | 2008303323 A | 12/2008 |

(Continued)

OTHER PUBLICATIONS

International Search Report dated Dec. 29, 2016, corresponding to International Application No. PCT/KR2016/011895.

*Primary Examiner* — Hai Vo
(74) *Attorney, Agent, or Firm* — Hauptman Ham, LLP

(57) ABSTRACT

Provided is a porous single resin fiber composite material comprising: a first fibrous particle; a second fibrous particle; and a binder for binding the first fibrous particle and the second fibrous particle, wherein the first fibrous particles and the second fibrous particles are bound by the binder so as to form a random network structure including pores, the first fibrous particle is a polyester-based fiber including a first polyester-based resin, the second fibrous particle is a polyester-based fiber including a second polyester-based resin, the binder includes a third polyester-based resin, the (Continued)

first fibrous particle has an elongation rate higher than that of the second fibrous particle, and the melting point of the second polyester-based resin is higher than the melting point of the third polyester-based resin.

10 Claims, 7 Drawing Sheets

(51) Int. Cl.
  *B29C 70/04* (2006.01)
  *D21H 15/10* (2006.01)
  *D21H 13/24* (2006.01)
  *C08J 5/04* (2006.01)
  *B29C 70/46* (2006.01)
  *D21H 15/12* (2006.01)
  *B29C 70/08* (2006.01)
  *B29C 70/12* (2006.01)
  *B29K 67/00* (2006.01)

(52) U.S. Cl.
  CPC ............ *B29C 70/12* (2013.01); *B29C 70/465* (2013.01); *C08J 5/046* (2013.01); *C08J 5/048* (2013.01); *D21H 13/24* (2013.01); *D21H 15/10* (2013.01); *D21H 15/12* (2013.01); *B29K 2067/003* (2013.01); *C08J 2367/02* (2013.01)

(56) References Cited

FOREIGN PATENT DOCUMENTS

| | | |
|---|---|---|
| JP | 2015089972 A | 5/2015 |
| KR | 101289129 B1 | 7/2013 |

* cited by examiner

POROUS SINGLE RESIN FIBER COMPOSITE MATERIAL AND METHOD FOR MANUFACTURING POROUS SINGLE RESIN FIBER COMPOSITE MATERIAL

CROSS REFERENCE TO RELATED APPLICATION

This present application is a national stage filing under 35 U.S.C § 371 of PCT application number PCT/KR2016/011895 filed on Oct. 21, 2016 which is based upon and claims the benefit of priority to Korean Patent Application No. 10-2015-0148292 filed on Oct. 23, 2015, in the Korean Intellectual Property Office. The disclosures of the above-listed applications are hereby incorporated by reference herein in their entirety.

TECHNICAL FIELD

The present invention relates to a porous single resin fiber composite material and method of manufacturing the porous single resin fiber composite material.

BACKGROUND ART

Conventional thermoplastic composite materials are composed of the high strength reinforced fibers such as glass fibers and carbon fibers, etc., that exhibit high rigidity and thermoplastic resins that form a matrix. These thermoplastic composite materials are widely used for automobiles and architectural materials since they exhibit higher mechanical properties than general thermoplastic resin products. A conventional method for preparing a thermoplastic composite material mainly includes mixing a reinforced fiber with a thermoplastic resin, and then extruding or molding the mixed product through mold pressing. Recently, in order to improve the strength and the productivity, the composite material has been prepared by applying a dry needle punching process or a wet papermaking process to preferentially manufacture a mat-shaped material including the reinforced fiber, and then, impregnating the resin in the mat.

The composite material composed of the reinforced fiber and the thermoplastic resin exhibits excellent mechanical strength since the reinforced fiber serves as a reinforcing material. These fiber reinforced composite material generally uses a fiber having a high strength, unlike the thermoplastic resin, such as the glass fiber and the carbon fiber. Since for the composite material manufactured as above, the additional process of separating the fiber and the resin is essentially required for the recycling since the component of the thermoplastic resin is different from that of the reinforced fiber. In addition, the separate surface material treatment, e.g. the film coating or lamination of the non-woven fabric, etc. is necessary since the glass fiber may cause a environmental issue or a handling issue when exposed on the surface after molding into the composite material. In addition, since the different kinds of the materials have the Fiber-Matrix structure, the compatibility between the materials is low and they exhibit the strength less than the expected degree. Thus, an additive such as a crosslinking agent to improve this compatibility has to be essentially included during the manufacturing. Due to these additional processes, the process has become complex, and there has been a problem of increasing prices of the materials.

DISCLOSURE

Technical Problem

It is an embodiment of the present invention to provide a porous single resin fiber composite material excellent in moldability while implementing an excellent mechanical strength, a sound absorption performance, a thermal insulation and a weight reduction.

It is another embodiment of the present invention to provide a method of manufacturing the porous single resin fiber composite material.

Technical Solution

In accordance with one embodiment of the present invention, there is provided a porous single resin fiber composite material including: a first fibrous particle; a second fibrous particle; and a binder for binding the first fibrous particle and the second fibrous particle, wherein the first fibrous particles and the second fibrous particles are bound by the binder so as to form a random network structure including pores, wherein the first fibrous particle is a polyester-based fiber including a first polyester-based resin, wherein the second fibrous particle is a polyester-based fiber including a second polyester-based resin, wherein the binder includes a third polyester-based resin, wherein the first fibrous particle has an elongation rate higher than that of the second fibrous particle, and wherein the melting point of the second polyester-based resin is higher than the melting point of the third polyester-based resin.

In accordance with another embodiment of the present invention, there is provided a method of manufacturing the porous single resin fiber composite material, including dispersing a reinforced fiber and a bicomponent polymer fiber in an acidic aqueous solution to prepare a slurry solution; forming a web from the slurry solution by a wet papermaking process; and heat treating and drying the formed web to prepare a porous single resin fiber composite material; wherein the reinforced fiber includes a first polyester-based resin, wherein the bicomponent polymer fiber includes a core part and a sheath part, wherein the core part includes the second polyester-based resin, the sheath part includes the third polyester-based resin, the binder includes the third polyester-based resin, wherein the first fibrous particle has the elongation rate higher than that of the second fibrous particles, and the melting point of the second polyester-based resin is higher than the melting point of the third polyester-based resin.

Advantageous Effects

The porous single resin fiber composite material exhibits excellent mechanical strength, sound absorption performance, thermal insulation and weight reduction, and is environmentally friendly, and is easy in recycling, and reduces the production cost, and the moldability thereof is excellent.

BEST MODE

Figure 1:
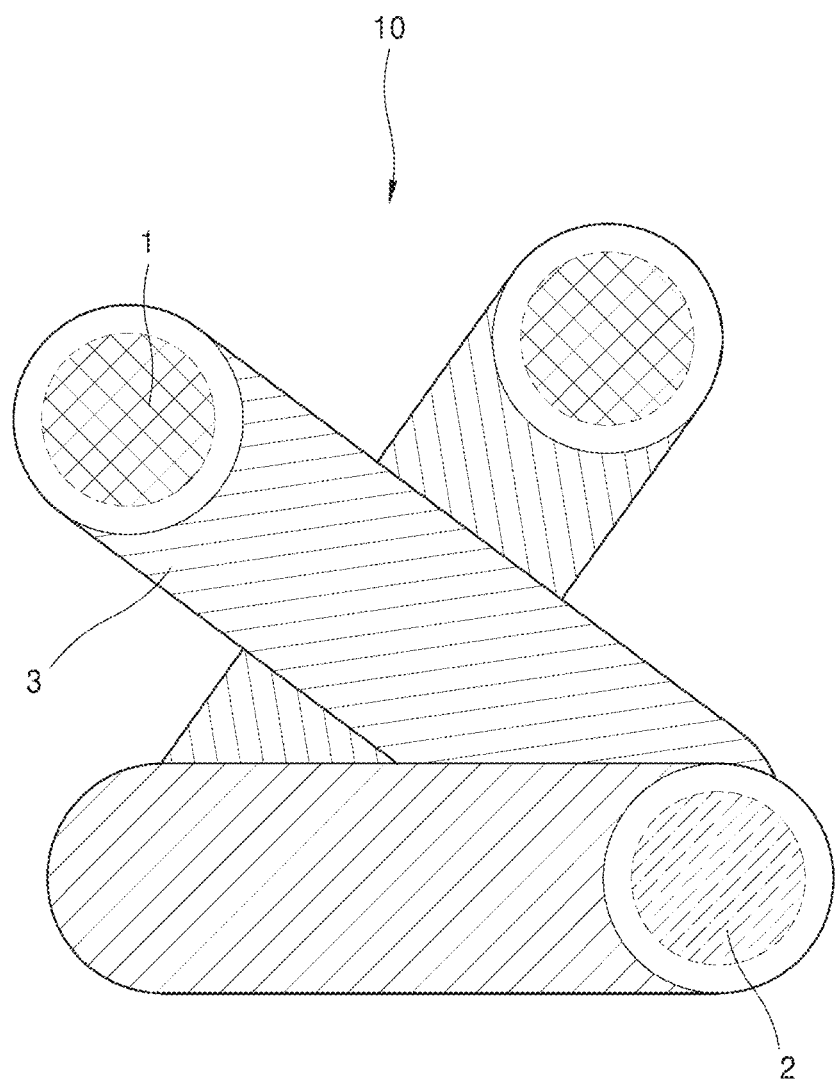
FIG. 1 is a simplified schematic view of a porous single resin fiber composite material in accordance with an exemplary embodiment of the present invention.

Hereinafter, the exemplary embodiments of the present invention will be described in detail. However, the following exemplary embodiments are only provided by way of example of the present invention, and the present invention is not limited thereto, but may be defined only by the scope of the following claims.

In accordance with an exemplary embodiment of the present invention, there is provided a porous single resin fiber composite material, including a first fibrous particle; a second fibrous particle; and a binder for binging the first fibrous particle and the second fibrous particle, wherein the first fibrous particle and second fibrous particle are bounded by the binder so as to form a random network structure including pores, the first fibrous particle is a polyester-based fiber including the first polyester-based resin, the second fibrous particle is a polyester-based fiber including the second polyester-based resin, and the binder includes the third polyester-based resin, the first fibrous particle has an elongation rate higher than that of the second fibrous particle, and the melting point of the second polyester-based resin is higher than the melting point of the third polyester-based resin.

The first fibrous particle is the stretched polyester-based fiber having an elongation rate of about 300% to about 600% and the second fibrous particle is an unstretched polyester-based fiber of 0%, or the stretched polyester-based fiber having an elongation rate less than about 300%.

The polyester-based fiber may be polyester terephthalate (PET) fiber.

For example, the polyester-based fiber may control the elongation rate to control the mechanical strength and the rigidity of the fiber itself. For example, when the elongation rate in the longitudinal direction of the polyester-based fiber is increased, the degree of crystallinity of the polyester-based fiber is high and the mechanical strength and the rigidity are improved.

The crystallinity affecting the strength of the polyester-based resin may be measured by using a differential scanning calorimeter (DSC, Perkin-Elmer, DSC8000) instrument. In measuring it by DSC, the analysis related to the crystallinity it may construed that the higher $\Delta H$ (J/g) value is, the higher the degree of crystallinity is.

As described above, the higher the elongate rate is, higher the crystallinity is, and thus, $\Delta H$ value by DSC analysis gets higher. Accordingly, it is possible to analyze about the crystallinity of the polyester-based resin depending on the elongation rate.

The porous single resin fiber composite material includes the stretched polyester-based fiber having the elongation rate of about 300% to about 600% as the first fibrous particle to implement the excellent mechanical strength and the rigidity and minimize the shrinkage during hot molding.

The porous single resin fiber composite material includes, in addition to the first fibrous particle, the second fibrous particle having the different elongation rate and supplements elasticity, and attenuates impact energy effectively against an impact from outside, thereby improving impact resistance or impact absorption.

The first fibrous particle and the second fibrous particle are present in a state of partially or entirely coated by the binder component. That is, the first fibrous particle and the second fibrous particle form a coating part which is formed of the binder on the respective particle surface.

Each coating part of the first fibrous particle and the second fibrous particle is fused and the first fibrous particle and the second fibrous particle may be randomly bound. The first fibrous particle and the second fibrous particle bound as above may form a random network structure including pores.

FIG. 1 is a simplified schematic view of the porous resin single fiber composite 10 including the first fibrous particle 1, the second fibrous particle 2 and a binder 3 in accordance with an exemplary embodiment of the present invention.

The porous resin single fiber composite material is a composite material, which are excellent in all of strength, sound absorption performance, and thermal insulation. The compatibility between the resins is very excellent by using the polymer material of same kind of single resin for the first fibrous particle, the second fibrous particle, and the binder within the porous single resin fiber composite materials, and accordingly, the porous single resin fibrous composite material may implement very excellent strength. In addition, as the porous single resin fiber composite material consists of the polymer material only, it has the excellent moldability and the recycling is easy.

The porous single resin fiber composite material may be manufactured according to the method of manufacturing porous single resin fiber composite material described later, and the porous single resin fiber composite material manufactured as above is manufactured with the first fibrous particle and second fibrous particle dispersed well.

As such, when the first fibrous particle and the second fibrous particle are well dispersed in the resin, the cohesion between the first fibrous particle and the second fibrous particle is enhanced by having the binder as a medium, to implement more excellent strength of the porous single resin fibrous composite material.

The porous single resin fiber composite material not only improves the compatibility between the resins by using the same kind of the resin, as described above, but also improves the dispersion of the first fibrous particle and second fibrous particle (for convenience, also referred to as 'the fibrous particles') based on the correlation between the dispersibility and the strength, which has been found, thereby obtaining a synergy effect to show highly improved strength properties.

There is a method of comparing the strength as an indirect method to confirm that the dispersibility of the fibrous particles included in the porous single resin fiber composite material has improved. When the dispersibility of the fibrous particles is improved, it leads to the strength improvement of the porous single resin fibrous composite material, and thus, the strength may be compared, by varying the dispersibility of the fibrous particles only, for example, by varying the manufacturing method, while maintaining the other conditions such as the kinds and the contents, etc. of the first fibrous particle, the second fibrous particle, and the binder included in the porous single resin fiber composite material.

As the porous single resin fiber composite material implements the excellent mechanical strength, it is possible to mold it into the board or the sheet with the thin thickness, and thus, the weight reduction is possible.

The porous single resin fiber composite material may be also manufactured into a sheet that the first fibrous particle and the second fibrous particle have the one-direction orientation. As such, when the one-directional orientation is imparted to the sheet of the porous single resin fiber composite material, the sheet would have the high mechanical properties along a direction to which the orientation thereof is imparted. Such sheet is appropriate for being applied as the material capable of withstanding a large force in a specific direction.

Since the polyester-based fibers which are the polymer fibers forming the first fibrous particle and the second fibrous particle have the different strengths or the melting points, the porous single resin fiber composite material may be designed to exhibit excellent properties as a whole by appropriately adjusting the numerical value of the content ratio between them, each strength or the melting point, thereby elaborately adjusting the relationship between the aimed properties such as the strength, the sound absorption performance, and the thermal insulation. For example, since the melting point of the third polyester-base resin included in the binder is relatively low, the porous single resin fibrous composite has the property of the low moldability.

The first polyester-based resin forming the first fibrous particles has to be relatively high in strength in order for the first fibrous particle to act as the reinforced fiber which complements the strength of the porous single resin fiber composite material.

The second polyester-based resin forming the second fibrous particle has to be relatively low in strength and melting point compared to the first polyester-based resin, in order for the second fibrous particle to act to improve the elasticity and the impact absorption performance of the porous single resin fibrous composite material.

Referring to the method of manufacturing the porous single resin fiber composite material described below, the binder corresponds to a sheath part of the bicomponent fiber having the second fibrous particle as the core. In order for the sheath part of the bicomponent fiber to be melted at low temperature and some are transferred to the surface of the first fibrous particle, and, in order to bind first fibrous particle and the second fibrous particle as the binder, the melting point has to be relatively low.

The strength of the polyester-based resin is related to the elongation rate. When the elongation rate of the polyester-based resin increases, the strength increases, and, on the contrary, when the elongation rate is lowered, the strength is lowered.

In one embodiment, the first polyester-based resin may have the melting point of about 200 to about 270° C.

In another embodiment, the second polyester-based resin may have the melting point of about 200 to about 270° C.

In yet another embodiment, the third polyester-based resin may have the melting point of about 100 to about 200° C.

The melting point of the polyester-based resin may be measured by using a Thermogravimetric analysis (TGA, Pyris1) instrument.

The porous single resin fiber composite material uses the fibrous particles of the polymer fiber as the reinforced fiber, without using the glass fiber or the carbon fiber, and thus, it does not require the separate surface treatment process. This is why the glass fiber or the carbon fiber is harmful to the human body when exposed to the surface, and thus, the glass fiber or the carbon fiber has not to be exposed by the surface treatment process in manufacturing the composite material. On the other hand, since the porous single resin fiber composite material uses the polymer fiber and is not harmful to the human body when exposed to the surface, it does not need to treat the surface.

In addition, the porous single resin fiber composite material uses the fibrous particles of the polymer fiber instead of the glass fiber or the carbon fiber, and applies the polyester-based resin which is the thermoplastic polymer fiber showing the relatively low thermal conductivity to improve the heat resistance.

In addition, such thermoplastic polymer fiber has the low specific gravity compared to the glass fiber or the carbon fiber, and thus, in molding the same weight of the composite material, it may include a larger number of the fibrous particle and may be formed as the porous material having the low density of the porous single resin fiber composite material. A sound wave coming through an open pore of the porous single resin fiber composite material has an effect of being attenuated by vibration of the fibers, and thus, it is suitable to be applied as the sound absorption material. When applied as such a sound absorption material, as the porosity gets higher and the number of the contained fiber gets more, the porous single resin fiber composite material causes an excellent effect in which energy is attenuated. As described above, since the porous single resin fiber composite material uses the fibrous particle having relatively low density compared to the glass fiber or the carbon fiber, the number of the fibrous particle increases in the composite material based on the same weight of the composite material, thereby having the improved sound absorption performance. In particular, since the thermoplastic polymer fiber has a high degree of freedom upon the vibration compared to the hard reinforced fibers such as the glass fiber or the carbon fiber, the effect of attenuating the sound energy by the vibration of the fiber is excellent. Thus, the porous single resin fiber composite material may have a more excellent sound absorption performance and it can be applied effectively to the field requiring the excellent sound absorption performance.

The thermoplastic polymer fiber has 25% or less level of the thermal conductivity compared to the glass fiber and the carbon fiber, and thus, the porous single resin fiber composite material has an advantage of minimizing the heat transfer which is conducted through the fiber. Accordingly, the single resin composite material shows the excellent thermal insulation performance.

In an exemplary embodiment, a weight ratio of a content of the first fibrous particle to the sum of contents of the second fibrous particle and the binder in the porous single resin fibrous composite materials may be about 25:75 to about 60:40. As the content of the first fibrous particle gets higher, it has a tendency of having the excellent strength, or the degree of the improvement may be reduced in above a certain content level. The above content range is the content range appropriate for effectively securing an effect in which the strength is improved according to an increase in the content of the first fibrous particle, while simultaneously for achieving an effect from the second fibrous particle.

The second fibrous particles and the binder are derived from the bicomponent polymer fiber in the method of manufacturing the porous single resin fiber composite material described below. Therefore, in the method of manufacturing the porous single resin fiber composite material described below, the contents of the first fibrous particle and the bicomponent polymer fiber may be adjusted to the above-mentioned range to manufacture the porous single resin fiber composite material having the above-described content ratio.

In another embodiment, the porous single resin fiber composite material may include the weight of the binder about 40 parts by weight to about 250 parts by weight of based on 100 parts by weight of the second fibrous particles. By adjusting the content ratio of the second fibrous particle and the binder to the above-mentioned content ratio, the excellent dispersibility may be maintained while appropriately imparting the binding force and the elasticity.

As described above, in the method of manufacturing the porous single resin fiber composite material described later, by adjusting the content ratio of the core part and the sheath part of the bicomponent polymer fiber, the content ratio of the second fibrous particle and the binder may be implemented.

The porosity of the porous single fiber composite material may be about 30 to about 80% by volume. As described above, the porous single resin fiber composite material forms the open pores while forming the network structure. The porous single resin fiber composite material to have the porosity of the above-described range may realize the weight reduction while maintaining the strength, and may also have the excellent sound absorption performance.

The porous singe resin fiber composite material may achieve weight reduction as described above, and, specifically, the density thereof may be about 0.1 g/cm$^3$ to about 1.6 g/cm$^3$.

The porous single resin fiber composite material may be manufactured in a form suitable for the use to be applied, for example, a sheet, through the wet papermaking process, etc.

The sheet of the porous single resin fiber composite material may be manufactured to have the weight suitable for the use to be applied, and, for example, with a sheet having the weight of about 50 g/m$^2$ to about 1200 g/m$^2$.

The first fibrous particles may have a cross-sectional diameter of about 5 µm to about 40 µm. The first fibrous particle having the thickness in the above-mentioned range may secure the orientation and the dispersibility while imparting the strength appropriately. The porous single resin fiber composite material including the first fibrous particles having the above-described thickness is resistant against the external impact, and, when the first fibrous particles are dispersed in the aqueous solution when manufacturing it according to the method of manufacturing the porous single resin fiber composite material described below, it has the appropriate hydroentangle property in the aqueous solution, and thus, the sheet may be easily formed.

The first fibrous particle may have a length of about 6 mm to about 24 mm, and specifically, about 12 mm to about 24 mm. The first fibrous particles having the above-mentioned range of length may secure the orientation and the dispersibility while imparting the strength appropriately, and, also, may impart the cohesion between the fibrous particles appropriately in order for the porous single resin fiber composite material to have the excellent strength. Further, at the same time, the first fibrous particles prevent the dispersibility being reduced due to the entanglement and agglomeration of fibers when the fibers are too long, and are appropriate for forming a sheet.

Specifically, the second fibrous particle may have a cross-sectional diameter of about 5 µm to about 30 µm. The second fibrous particles having a thickness in the above-described range may appropriately impart strength and ensure the orientation and the dispersibility. The porous single resin fiber composite material including the second fibrous particle having a thickness in the above-described range has the excellent strength property, and, in manufacturing the method of manufacturing the porous single resin fiber composite material described later, when the second fibrous particles are dispersed in the aqueous solution, it is possible to provide an appropriate hydroentangle property in the aqueous solution, and thus, the sheet may be easily formed.

The second fibrous particle may have a length of about 3 mm to about 6 mm. The second fibrous particle having the above-described range of length may impart appropriate strength and secure the orientation and the dispersibility, and further, may provide the bonding force between the fibrous particles appropriately, such that the porous single resin fiber composite material may have an excellent strength, while simultaneously preventing fibers from agglomerating so as to form a rope shape resulting in the reduction in dispersibility when the fibers are too long, and it is appropriate for forming the sheet.

The shorter the fiber length is, the better the dispersibility is in the aqueous solution, but the strength tends to be decreased. By combining the first fibrous particle and the second fibrous particle having the above-mentioned range of length, the excellent strength property, as well as the excellent dispersibility, can be realized.

Since the first fibrous particle has to perform the function of the reinforced fibers, it may use the fiber longer than the second fibrous particle.

As described above, when the second polyester-based resin and the third polyester-based resin are selected as exemplified above, the melting point of the second polyester-based resin is required to be higher than that of the polyester-based resin.

Further, the second polyester-based resin and the polyester-based resin may be selected, respectively, so that the materials of the core part and the sheath part of the bicomponent polymer fiber used in the method of preparing the porous single resin composite material to be described below satisfy the conditions above.

Specifically, the melting point of the second polyester-based resin may be about 160° C. or more. More specifically, the melting point of the second polyester-based resin may be about 200° C. to about 400° C. By allowing the second polyester-based resin to have the above-described range of the melting point, a fibrous phase may be maintained even after the binder is melted at the time of low-temperature molding. When the melting point of the second polyester-based resin is less than 160° C., a thermoforming temperature needs to be excessively reduced so as to maintain the fibrous phase, otherwise, there is a concern of causing the deformation in size or the polymer deterioration, etc., since the porous single resin fiber composite material has the reduced thermal stability afterwards. Further, a temperature difference from the third polyester-based resin may be excessively reduced, and thus, it may be difficult to adjust a molding temperature.

Specifically, the melting point of the third polyester-based resin may have the melting point of less than about 200° C. The binder may serve to bind the first fibrous particle and the second fibrous particle, and, when the third polyester-based resin forming the binder has a lower melting point than that of the second polyester-based resin, and has a relatively low melting point, it may be melted at a low temperature, and thus, the low-temperature moldability may be secured. Thus, as the binder, for example, the low melting point polyester, etc., may be used. Since the low melting point polyester is melted at about 100° C. to about 140° C. which is lower than that of a general polyester, the low melting point polyester, specifically, the low melting polyethylene terephthalate may be selected according to the molding temperature to be applied.

One of the methods of modifying polyethylene terephthalate to obtain the low melting point polyethylene terephthalate is a method of adding a copolymerizable monomer to polyethylene terephthalate. Polyethylene terephthalate includes a phthalate unit, and a bezene ring and an ester of the phthalate unit form 1,4-(para) bonding. When the part of the phthalate units having 1,4-(para) bonding in polyethylene terephthalate are substituted with phthalic units having 1,2-(ortho) and/or 1,3-(meta) bonding and/or the isophthalic unit, the low melting point polyethylene terephthalate can be obtained since the crystallinity is lowered and the melting point is lowered.

The binder may be the low melting point polyethylene terephthalate, in which more than 0 to about 50 mol %, specifically, about 20 to about 40 mol % of the phthalate units of polyethylene terephthalates has been substituted with the phthalic unit and/or the isophthalic unit.

As another method of obtaining the low melting point polyethylene terephthalate by modifying a polyethylene terephthalate, the melting point may be lowered by replacing the part of ethylene glycols which are the monomers forming the ethylene units of a polyethylene terephthalate with the glycols of the chains having the high number of carbon. For example, the third polyester resin may use PET-G (Polyethylene terephthalate glycol-modified) obtained by copolymering cyclohexane dimethanol (CHDM) with ethylene glycol in synthesizing the polyester resin. In PET-G, the length of a unit derived from cyclohexane dimethanol is inconsistent with that of a neighboring ethylene unit in polyethylene terephthalate, which generate the interface, and these interfaces interrupt the crystallization, thereby functioning to lower the melting point of PET, and resulted in an amorphous phase. As the co-monomer which can be used together with ethylene glycol to lower the melting point of polyethylene terephthalate glycol having the chain of high number of carbon such as trimethylene glycol or 2-methyltrimethylene glycol, etc., in addition to CHDM, may be used.

In another embodiment, the specific gravity of the second polyester-based resin is more than about 1. According to the method of manufacturing the porous single resin fibrous composite material described below, the bicomponent polymer fiber is dispersed in the acidic aqueous solution, the material of the specific gravity greater than 1 which is the specific gravity of water has to be used to facilitate to improve the dispersibility and to form a network structure. Therefore, the core part of the bicomponent polymer fiber may be the polyester-based resin having the specific gravity greater than 1.

The composite material porous single resin fiber may be manufactured by the board having the density of 0.2 g/cm³ to about 1.6 g/cm³.

The board may be manufactured in a state that the porous single resin fiber composite material is compressed to a predetermined level. For example, the board may be obtained by laminating many folds of the porous single resin fiber composite material sheets, a single sheet of which has been obtained by the wet papermaking process, followed by press-molding it.

As the press-molding is performed in multi-step process, by performing the heat treatment process alternately, the dispersibility of the binder may be further improved. For example, the porous single resin fiber composite material sheets in many foleds being laminated are press-molded, followed by increasing the temperature, and press-molding it at room temperature again, so as to obtain the final board. By performing the heat treatment process between the press processes, the heat transfer to the central part of the board is easy and the binder is melted well, and thus, can be distributed evenly. As such, by dispersing the binder evenly, the board may obtain the properties that are highly uniform overall.

The press-molding may be performed at a compression rate of 80 to 95%. By adjusting the compression density of the fiber by the press-molding, it is possible to realize the excellent strength property and the excellent sound absorption property.

The board including the pore structure is formed. Generally, the composite material manufactured through the mold press process by mixing and extruding the raw material is difficult to form the pore structure, while the board forms the pore structure as it is manufactured by using the porous single resin fiber composite material.

Specifically, the board may have the porosity of about 40 to about 80 vol. The porous single resin fiber composite material board is formed to have the porosity in the above-mentioned range, thereby making the strength, the impact resistance, and the sound absorption properties of the board of the porous single resin fiber composite material excellent.

Since the board of the porous single resin fiber composite material is in the compressed state of the porous single resin fiber composite material, and the structure thereof may be understood as the merely compressed form while maintaining the structure of the porous single resin fiber composite material as depicted in FIG. 1.

Specifically, the board may be manufactured by performing the press-molding such that the density of the board is about 0.2 g/cm³ to about 1.6 g/cm³. The board is manufactured by being compressed such that the density is in the above-mentioned range, fulfills the excellent strength.

The board of the porous single resin fiber composite material manufactured by being compressed as described above is excellent in the dispersibility of the fiber particles and may have the excellent mechanical properties over the entire board. For example, the board exhibits the evenly excellent impact strength results even when evaluating the impact strength property at many points. Specifically, the difference between the maximum value and the minimum value of the impact strength obtained within one board may be about 0.2 J/mm or less, of the impact strength obtained by performing the falling ball impact test according to ASTM D3763 for the board. In other words, it means that the difference of the impact strength by ASTM D3763 measured at any 2 points in the board may be about 0.2 J/mm or less.

Since the board is the material which may implement the weight reduction as it has the low density while implementing the high mechanical strength such as the tensile, flexural, and impact strength, it may be applied usefully to the use of the automobiles and the building materials requiring such properties. In addition, the board may satisfy the excellent sound absorption performance condition required as such automobile and the building materials.

In addition, since the board is the material composed of the single polymer as the main component, the recycling is easy without the additional separation process of different kinds, and because the glass fiber is not applied, the handling is excellent in operation.

In addition, the board is manufactured in a compressed state, as described above, and, afterwards, it has the feature which does not expand even by increasing the temperature.

Since the porous single resin fiber composite material board may be manufactured according to the manufacturing method described later, and, is manufactured from the porous single resin fiber composite material, within which the first fibrous particle and the second fibrous particle well dispersed, the dispersibility of the fibrous particles is excellent, and, in addition, by using a single resin for all the first fibrous particle, the second fibrous particle, and the binder, the compatibility for each component is increased and the cohesion is increased. As such, the first fibrous particle and the second fibrous particle are well dispersed and the cohesion between each component is increased, and the strength of the board of the porous single resin fiber composite material is increased.

The board of the porous single resin fiber composite material exhibits the excellent strength property by improving the dispersion and the compatibility of the fibrous particles, based on the thus obtained correlation between the dispersibility or the compatibility and the strength.

As one example of the method of confirming that the dispersibility of the fibrous particles included in the board of the porous single resin fiber composite material is improved, there is a method of evaluating the cross-section of the board of the porous single resin fiber composite material by the color difference meter. As the dispersibility of the fibrous particles is increased, a part in which the fibrous particles are agglomerated becomes smaller, and thus, white color is more uniformly exhibited. On the contrary, when the dispersibility of the fibrous particles is decreased, the part in which the fibrous particles are agglomerated and overlapped with one another becomes larger, and thus, the part becomes darker. The difference may be evaluated by using the color difference meter.

An indirect method of confirming that the dispersibility of the fibrous particles included in the board of the porous single resin fiber composite material is improved may include a method of comparing the strength. When the dispersibility of the fibrous particles is improved, the strength of the porous singe resin composite material is improved. Thus, the board of the porous single resin fiber composite in which only the dispersibility of the fibrous particles is different, for example, by changing the preparation method, etc., while maintaining the other conditions such as kinds, and contents, etc., of the first fibrous particle, the second fibrous particle, and the binder included in the porous single resin fiber composite material, may be prepared, and then, the strength thereof may be compared.

The board of the porous single resin fiber composite material also may be manufactured from the porous single resin fiber composite material manufactured by imparting the one-direction orientation to the fibrous particles, as described above. The porous single resin fiber composite material board may be manufactured with the composite material sheet that the first fibrous particles and the second fibrous particles are bound by the binder so as to form the random network structure including pores, followed by laminating many folds of the composite material sheets and press-molding it, while the composite material sheet has high mechanical properties along the direction in which the orientation is imparted, when the one-direction orientation is imparted to the fibrous particles at the composite material sheet. The board of the porous single resin fiber composite material obtained by laminating such composite sheet in one direction, followed by press-molding, it may withstand a large force in a specific direction.

The plate of the porous single resin fiber composite material may be manufactured to have a weight suitable for the use to be applied, and may have, for example, a basis weight of about 600 g/m$^2$ to about 3000 g/m$^2$, and, for example, about 900 g/m$^2$ to 1400 g/m$^2$.

The composite material porous resin single fiber composite material board may have the thickness of about 2 mm to about 8 mm.

In accordance with another embodiment of the present invention, there is provided a method of manufacturing the porous single resin fiber composite material, including:

dispersing a reinforced fiber and a bicomponent polymer fiber in acidic aqueous solution to prepare a slurry;

forming the web from the slurry solution by a wet papermaking process; and heat treating and drying the formed web to manufacture a porous single resin fiber composite material.

The reinforced fiber includes the first polyester-based resin, the bicomponent polymer fiber includes a core part and a sheath part, and the core part includes the second polyester-based resin, the sheath part includes the third polyester-based resin, the strength or the melting point of the first polyester-based resin is different from the strength or the melting point of the second polyester-base d resin, the strength or the melting point of the first polyester-based resin is different from the strength or the melting point of the third polyester-based resin, the strength or the melting point of the second polyester-based resin is different from the strength or the melting point of the third polyester-based resin, provided that the melting point of the second polyester-based resin is higher than the melting point of the third polyester-based resin. The porous single resin fiber composite material described above may be manufactured by the method of manufacturing the porous single resin fiber composite material.

Figure 2:
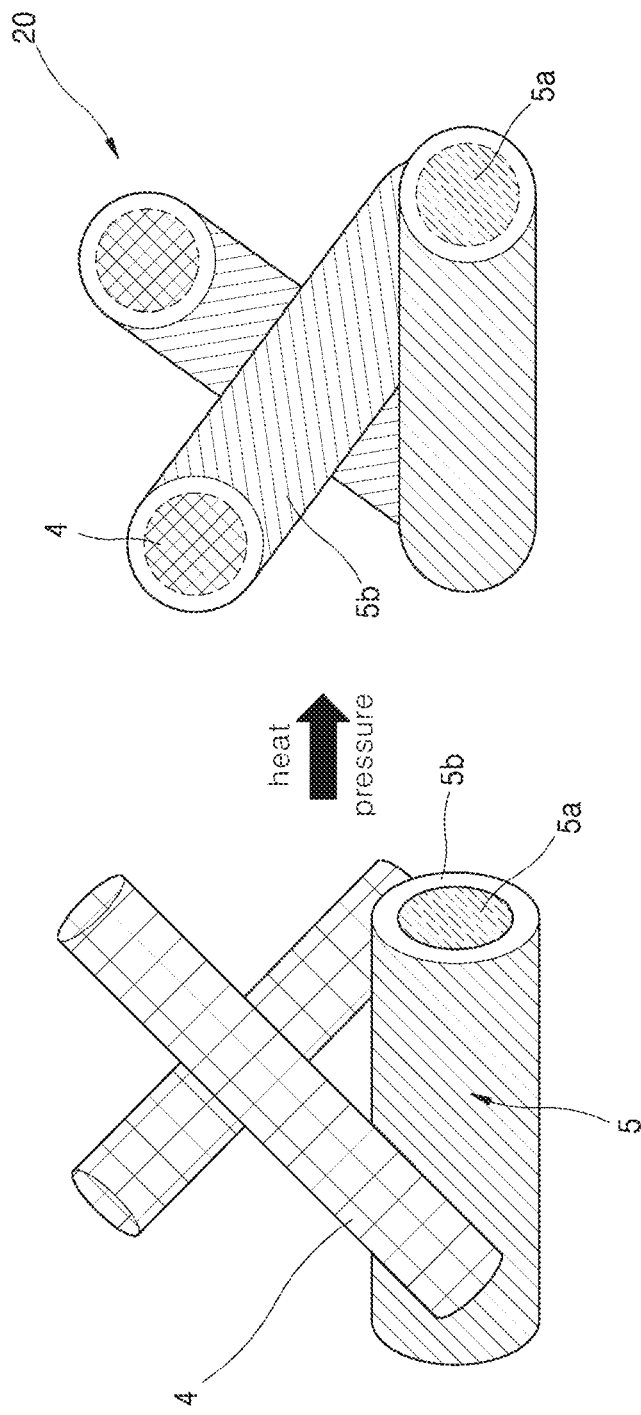
FIG. 2 shows preparation of a porous single resin fiber composite material according to another exemplary embodiment of the present invention which includes applying heat and pressure to a reinforced fiber and a bicomponent polymer according to a method for manufacturing the porous single resin fiber composite material.

FIG. 2 shows preparation of a porous single resin fiber composite material 20 which includes applying heat and pressure to a reinforced fiber 4 and a bicomponent polymer fiber 5 according to the method for manufacturing the porous single resin fiber composite material.

The reinforced fiber 4 may be the first fibrous particle formed with the first polyester-based resin described above. Therefore, a detailed description of the reinforced fiber 4 is the same as described for the first fibrous particle.

The bicomponent polymer fiber 5 includes the core part 5a and the sheath part 5b, and the core part 5a includes the second polyester-based resin, and the sheath part includes the third polyester-based resin 5b.

The detailed descriptions of the first polyester-based resin, the second polyester-based resin, and the third polyester-based resin are same as described above.

In the heat treatment and drying steps, the third polyester-based resin of the sheath part is melted and the reinforced fibers and the bicomponent polymer fiber are bound by the heat fusion to form the random network structure including pores.

The third polyester-based resin of the sheath part is present in a state in which the core part is coated and is melted in the heat treatment and the drying steps, and transferred to the reinforced fiber to partially or entirely coat the reinforced fibers, and, as the melted state is solidified, it acts as the binder for binding the core part of the bicomponent fiber and the reinforced fiber.

As such, since the sheath part acts as the binder, another binder may not be additionally used in the method of manufacturing the porous single resin fiber composite material. The thermoplastic resin forming the sheath part of the bicomponent polymer fiber has a relatively low melting point, and thus, it is possible to perform the low-temperature molding.

The porosity of the porous fiber reinforced composite material and the degree of coating transferred to the reinforced fiber, etc., may be adjusted by changing the amounts of the core part and the sheath part of the bicomponent polymer fibers. For example, the bicomponent polymer fiber may have the weight of the sheath part about 40 parts by weight to about 250 parts by weight based on 100 parts by weight of the core part.

Although the method of manufacturing the porous single resin fiber composite material disperses the bicomponent polymer fibers, which are manufactured from the polyester-based resin as a hydrophobic thermoplastic resin, the method of manufacturing the porous single resin fiber composite material improves the dispersibility by constituting the bicomponent polymer fiber with the core part and the sheath part, and increasing the specific gravity of the core part. As described above, when the specific gravity of the core part of the bicomponent polymer fiber is greater than 1, the degree of dispersion may be effectively improved during a stirring process in the aqueous solution.

In the reinforced fiber and the bicomponent polymer fiber, the sheath part may be surface-treated to further improve the dispersibility in the acidic aqueous solution. As a result, it is possible to manufacture a porous single resin fiber composite material board.

The surface treatment of the sheath part of the bicomponent polymer fiber and the reinforced fiber may be performed by introducing a functional group such as a fluoro group, a hydroxyl group, a carboxyl group, an alkyl group, or the like, onto a surface or by coating the surface with a coating agent. For example, when manufacturing the reinforced fiber and the bicomponent fiber polymer fiber, a surface treatment agent capable of acting on the surface of the sheath part of the bicomponent polymer fiber and the reinforced fiber to introduce the functional group may react with the fibers by a dipping process, etc.

Specifically, the reinforced fiber or the bicomponent polymer fiber may be subjected to silane treatment by the surface treatment agent or the coating agent usable in the manufacturing of the reinforced fiber and the bicomponent polymer fiber, thereby improving bonding strength between the fibers, improving the heat resistance by carbonization, improving the hydrophilicity by hydrolysis, or improving the water dispersibility by oxidation.

Examples of the surface treatment agent may include a fluorine-based wax (for example, PFAO, or the like), a hydrocarbon-based wax, and a silicone-based polymer, etc.

The coating agent may impart properties such as hydrophilicity/hydrophobicity, water repellency, flame retardancy, nonflammability, heat resistance, acid resistance, alkali resistance, durability, and fouling resistance, etc., depending on components thereof. Specifically, as the coating agent, a water-repellent agent such as a fluorine-based wax (for example, PFAO, or the like), a hydrocarbon-based wax, a silicone-based polymer compatibilizer, or the like, may be used.

A content ratio of the reinforced fiber and the bicomponent polymer fiber may be adjusted depending on the aimed physical properties of the porous single resin composite material to be manufactured.

For example, the weight ratio of the reinforced fiber and the bicomponent polymer fiber may be about 25:75 to about 60:40.

Specifically, in the method of manufacturing the porous single resin composite material, the reinforced fiber and the bicomponent polymeric fiber may be mixed in about 0.1 g to about 10 g of the total amount of the reinforced fiber and the bicomponent polymer fiber per 1 L of the acidic aqueous solution. By adjusting the total content of the reinforced fiber and the bicomponent polymer fiber within the above-described range, it is possible to maintain the excellent dispersibility to prepare a sheet having a uniform thickness, and, secure the property based on the excellent dispersibility.

The acidic aqueous solution may have a pH of about 1 to about 4. By adjusting the pH of the acidic aqueous solution to the above-described range, charges on the surface of the glass fiber may be generated without causing chemical decomposition of silica ($SiO_2$) or alumina ($Al_2O_3$), and boron ($B_2O_5$) which is a glass fiber component, due to the strong acid, and thus, dispersibility may be further improved.

In the method of manufacturing the porous single resin fiber composite material, stacking at least two folds of composite material sheets manufactured as a sheet shape, followed by press-molding it so as to manufacture a board of the porous single resin fiber composite material.

The method of manufacturing the porous single resin fiber composite material may further include stirring the slurry solution. By further implementing the step of stirring the slurry solution, the dispersibility may be further improved.

In the method of manufacturing the porous single resin composite material, the step of heat treating and drying the formed web may be performed at about 100 to about 180° C. The temperature range is determined based on a temperature at which the sheath part of the bicomponent fiber begins to soften or melt. When the temperature is lower than 100° C., it is difficult to dry moisture, and the bicomponent polymer fiber (the sheath part) does not sufficiently soften, and thus, the moisture may remain after drying into the form of the sheet, or it is difficult for the composite material sheet to have a fixed property. On the contrary, when the temperature is higher than 180° C., the sheath part of the bicomponent polymer fiber is completely melted, and thus, it is difficult to be uniformly transferred from the bicomponent fiber to the reinforced fiber. Further, there is a concern that the sheath part polymer of the bicomponent polymer fiber may be altered at a melting point or higher.

By appropriately adjusting the cross-sectional diameter of the core part of the bicomponent polymer fiber, followed by heat-treatment and drying at an appropriate heat treatment temperature, the core of the bicomponent polymeric fiber may not be melted, but may be included in the porous single resin fiber composite material manufactured as the fibrous particles.

During the wet papermaking process, the fibers are uniformly mixed in the slurry aqueous solution to form a hydroentangled web, going along a mesh that moves with a conveyor belt, wherein an inclination may be imparted as the fibers rise along the mesh, and thus, the sheet manufactured as described above may have the orientation. By imparting the orientation in one-direction to the fiber component in the porous single resin fiber composite material which is obtained by laminating the composite material sheet which the orientation is imparted as above, the strength in one-direction may be further strengthened.

As such, the board of the porous single resin fiber composite material may be manufactured such that the orientation is imparted selectively according to the use to be applied.

For example, when the fibers are moved from a head box to the conveyor belt to form a composite material sheet, an inclination may be imparted to a part where the sheet is formed (inclined web formation), and thus, it is possible to design the process so that the fibers are able to be laid well in a machine direction (MD), compared to the planar conveyor belt. The directionality may be imparted in the MD (machine direction) and a cross direction (CD) separately, and it is easier to impart the directionality in the MD direction as compared to the CD direction.

The slurry solution may further include an additive such as a crosslinking agent, or an additional binder.

The crosslinking agent acts to strengthen the chemical bonding force between the reinforced fiber and the bicomponent polymer fiber. For example, a silane-based compound, a maleic acid-based compound, etc. A content of the crosslinking agent may be about 0 to about 5 parts by weight based on 100 parts by weight of the total fibers (the sum of reinforced fiber and bicomponent polymer fiber).

The additional binder may be the water soluble polymers such as starch, casein, polyvinyl alcohol (PVA), carboxymethyl cellulose (CMC), etc.; emulsions such as polyethylene, polypropylene, polyamide, etc.; inorganic compounds such as cement, calcium sulfate-based clay, sodium silicate, alumina silicate, and calcium silicate, etc.

The content of the additional binder may be about 0 to about 5 parts by weight based on 100 parts by weight of the total fibers (the sum of the reinforced fiber and the bicomponent polymer fiber).

The board of the porous single resin fiber composite material is formed by compressing many sheets, for example, at least two or more folds of the composite material sheets, and, specifically, it is possible to decide as to how many layers are laminated according to the aimed weight per unit area of the final product. For example, when the final weight per unit area of the product aiming the composite material sheet is 1200 g/m², by laminating about 2 to 12 sheets, followed by applying heat and pressure and performing hot press-molding it, it is possible to manufacture the board of the porous single resin fiber composite material.

The hot press-molding may be performed at a temperature at which the core part is not melted and the sheath part of the bicomponent fiber is melted. When it is performed at such temperature range, the sheath part is melted and the interface between the composite material sheets may be fused.

Specifically, the hot press-molding may manufacture the board of the porous single resin fiber composite material by laminating molding of the composite sheet while applying the pressure of about 1 to about 30 bar at the temperature of about 100 to about 180° C.

The hot press-molding may be performed in order for the board of the porous single resin fiber composite material to be manufactured successively by the double-belt press-molding.

According to another embodiment, the porous single resin fiber composite material may be manufactured as follows. First, after the reinforced fiber and the bicomponent polymer fiber are blended, the blended fibers are stirred in an aqueous solution including the additives, and then moved to the head box in which the web is able to be formed. The slurry in the headbox passes through a vacuum intake system to form a wet web, and is manufactured into a composite material sheet by passing through a dryer. A weight of the composite material sheet may be about 50 grams to about 600 grams per square meter to easily perform the subsequent thermo-forming. A drying temperature is set to about 100° C. to about 180° C. according to the material of the sheath part so that the sheath part of the bicomponent polymer fiber is able to act as the binder. The manufactured composite material sheet is cut according to the usage and stacked, and is manufactured into a form having a thickness of about 2 mm to about 8 mm through a thermo-compression press.

For example, the hoard of the porous single resin fiber composite material may be manufactured into the board having the thickness of 2-4 mm, by heating it at about 200° C., followed by conveying it to a press at room temperature again, and then, press-molding it.

Figure 3:
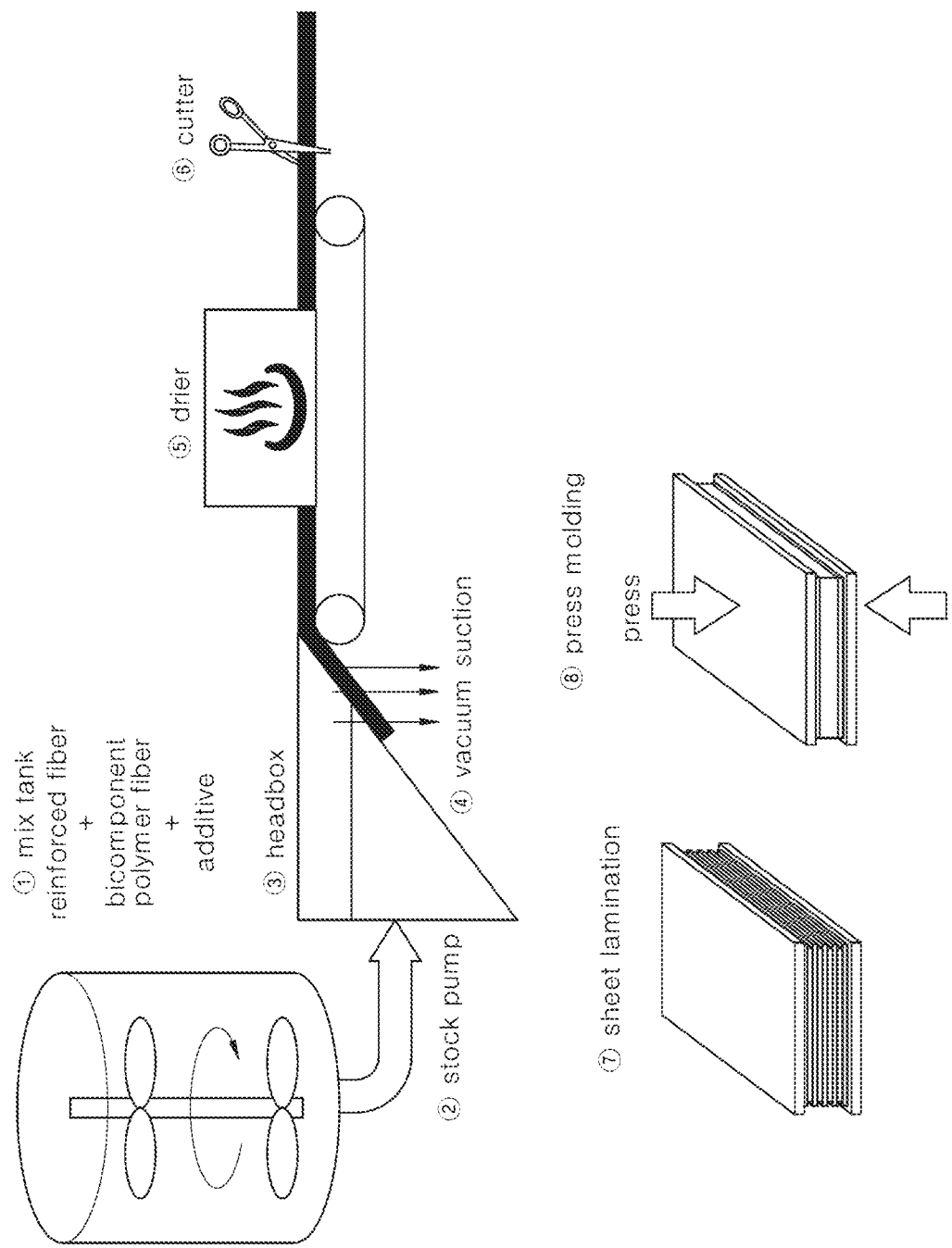
FIG. 3 is a view schematically showing a method of manufacturing the porous single resin fiber composite material board described in accordance with another embodiment of the present invention.

FIG. 3 is a view schematically showing the method of manufacturing a porous single resin fiber composite material described according to the exemplary embodiment of the present invention.

Hereinafter, Examples and Comparative Examples of the present disclosure will be described. However, the following Examples are only provided as one exemplary embodiment of the present invention, and the present invention is not limited to the following Examples.

EXAMPLES

Example 1

A bicomponent polymer fiber in which a polyethylene terephthalate core part and a low melting point polyethylene terephthalate sheath part had a weight ratio of 50:50 and a length was 5 mm and a thickness was 4 denier (about 20 μm in cross-sectional diameter) to ensure the water dispersibility, was prepared. Polyethylene terephthalate of the sheath part is the low melting point polyethylene terephthalate of 110° C. of the melting point, in which 30 mol % of phthalate unit of polyethylene terephthalates has been substituted with the isophthalic unit.

As the reinforced fiber, polyethylene terephthalate fiber, for which the 300% drawn yarn is used to prevent the shrink phenomenon during drying and preheating, was used, and polyethylene terephthalate was prepared by cutting it to 13 mm length.

40 parts by weight of the reinforced fiber and 60 parts by weight of the bicomponent polymer fiber were blended, and stirred in an aqueous solution with pH adjusted to 2 using hydrochloric acid for 1 hour. Here, a total content of the reinforced fiber and the bicomponent polymer fiber was 2 g per 1 L of water. The aqueous solution slurry after the stirring process was subjected to a wet papermaking process to form a web through a vacuum suction device in a head box. After the web was formed, the web was passed through an oven dryer at 140° C. to completely dry moisture. The dried composite material sheet manufactured as the porous single resin fiber composite material had a thickness of about 5 mm at 300 g/m². The 4 sheets were laminated so that the basis weight was 1200 g/m², followed by a hot press process at 170° C., to form it into the board having a thickness of 5.0 mm. The board was heat treated in an IR oven at 200 for 2 minutes and moved to a press at room temperature, and a pressure was applied thereon. Here, the pressure was applied so that the board did not come out from the mold, i.e., 100 ton/m², and thus, finally, the board having the thickness of 2.0 mm was molded. Here, the compression rate is 90% (compressed from 20.0 mm of the total composite sheets with 4 laminated layers into 2.0 mm) and the porosity is 56%.

Example 2

The board having 2.0 mm of thickness was molded in the same manner as in Example 1, except that the number of the laminated sheet was changed so that the basis weight of the board is 1000 g/m². Here, the compression rate is about 87%.

Example 3

The board having the thickness of 2.0 mm was molded in the same manner as in Example 1, except that the number of the laminated sheet was changed so that the basis weight of the board is 1600 g/m². Here, the compression rate is about 92%.

Example 4

The board was manufactured having a compression rate of 95% (compressed from 20.0 mm of the total composite sheets with 4 laminated layers into 1.0 mm) so that the thickness of the final board is 1.0 mm in Example 1. The porosity of the board is 13%.

Example 5

The board was manufactured by having a compression rate of 7% (compressed from 20.0 mm of the total composite sheets with 4 laminated layers into 3.0 mm) so that the thickness of the final board is 3.0 mm. The porosity of the board is 17%.

Example 6

The board was manufactured by having a compression rate of 75% (compressed from 20.0 mm of the total composite sheets with 4 laminated layers into 5.0 mm) so that the thickness of the final board is 5.0 mm. The porosity of the board is 82%.

Comparative Example 1

The board was manufactured in the same manner as in Example 1, except that the glass fiber was used instead of the polyester fiber used as the reinforced fiber, in Example 1.

Comparative Example 2

The board was manufactured in the same manner as in Example 1, except that 20 parts by weight of the glass fiber, 20 parts by weight of the reinforced fiber, and 60 parts by weight of the bicomponent polymer fiber were blended, by replacing the half of the polyester fiber used as the reinforced fiber with the glass fiber.

Evaluation

Experimental Example 1

Figure 4:
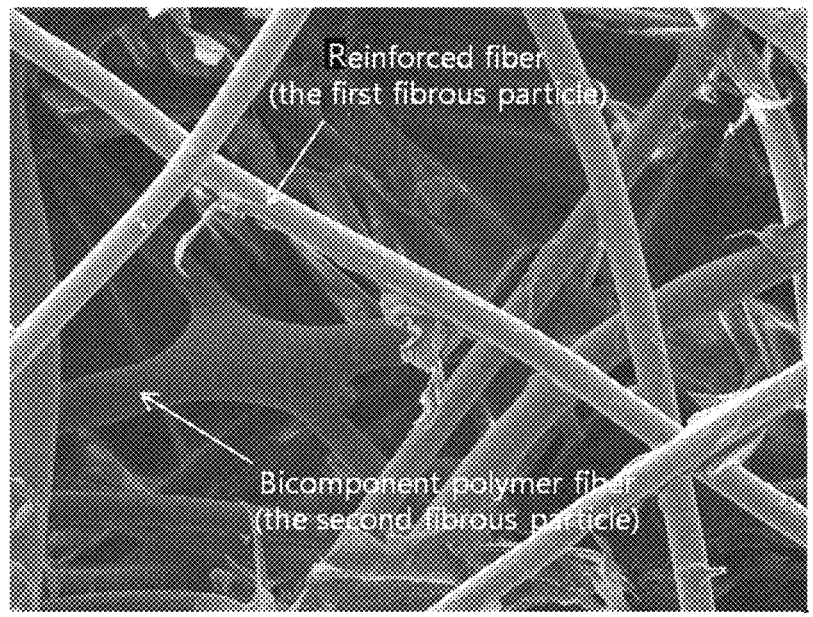
FIG. 4 is a SEM picture of the cut surface of the board manufactured in Example 1.

FIG. 4 is a SEM photograph of the cut surface of the board manufactured in Example 1. PET fiber which is the reinforced fiber and PET fiber which is the bicomponent fiber are well represented as indicated in the SEM photograph. That is, it was confirmed that each first fibrous particle and second fibrous particle derived from the reinforced fiber and bicomponent fibers were formed well in the board.

Experimental Example 2

The mechanical property was compared, with regard to the board manufactured in Examples 1 to 6 and Comparative Examples 1 and 2. First, the mechanical property was measured after leaving the specimen at room temperature for 24 hours. The tensile strength and the elongation rate were measured according to ASTM D638 and the falling ball impact test was measured according to ASTM D3763. Likewise, Notched IZOD test was performed according to ASTM D256 and the results thereof were shown in Table 1 below.

TABLE 1

| Classification | Tensile strength (MPa) | Elongation rate (%) | Impact energy (falling-ball) Total NTT (J/mm) | Impact energy (IZOD) (J/m) |
| --- | --- | --- | --- | --- |
| Example 1 | 70 | 20 | 3.14 | 300 |
| Example 2 | 50 | 23 | 2.65 | 230 |
| Example 3 | 90 | 15 | 3.92 | 340 |
| Comparative Example 1 | 60 | 2 | 2.43 | 280 |
| Comparative Example 2 | 55 | 5 | 2.40 | 280 |

In case of Example 1, compared to Comparative Example 1, although the polyester fiber used as the reinforced fiber shows the low strength compared to the glass fiber, it was confirmed that the compatibility was improved and the tensile strength of the total composite material was improved by 15%. In addition, since the elongation rate of the PET fiber itself is about 40% and has the value which is about 8 times of the elongation rate of 5% of the glass fiber itself, the elongation rate of the total composite material is increased about 10 times. Due to the above, the board of the porous single resin fiber composite material of Example 1 has the property of not being broken by having the low modulus value even in the high strength and the high modification condition.

In addition, in case of Example 1, it shows high falling-ball impact strength value and IZOD impact strength value compared to Comparative Example 1, this is because the polyester fiber (the reinforced fiber) in the composite material having the relatively low modulus compared to the glass fiber dispersed the energy by the external impact. In addition, since the density of the polyester fiber is about 1.38 g/cm³ and shows the density which is low by about 50% compared to 2.7 g/cm³ which is the density of the glass fiber, even though Example 1 and Comparative Example 1 were manufactured to have the same apparent specific gravity and the weight, the number of the fibers of Example 1 is high. Accordingly, it was confirmed that the impact strength was improved since the probability of dispersing the energy by the external impact is increased.

As in Comparative Example 2, when the reinforced fiber was used by mixing the polymer fiber and the glass fiber, the elongation rate is slightly increased compared to Comparative Example 1, but is still inferior than Example 1 and the tensile strength and the impact strength show the equivalent or less than level. This is because, in manufacturing the composite into the sheet or the board, as the kinds of the fiber increases, the repulsive power between the fibers is increased, thereby reducing the dispersibility, and after thermoforming, the compatibility between the fibers is reduced. Accordingly, in Comparative Example 1 and Comparative Example 2, the effect of improving the mechanical property is reduced by the addition of the reinforced fiber of the glass fiber, and, Example 1 in which the composite material is composed of a single resin exhibits the highest mechanical property.

In Examples 2-3, the board of the porous single resin fiber composite material was manufactured such that the basis weight of the same thickness as in Example 1 is 1000 g/m$^2$ and 1600 g/m$^2$, respectively. As shown in Table 1, as the basis weight is increased, the density of the composite material is increased, and thus, it was found that the tensile strength is increased and the elongation rate is reduced.

Experimental Example 3

With regard to the boards of Examples 1 to 3, the sound absorption performance property was compared.

The sound absorption performance was measured according to KS2816-2 with regard to each board. The results thereof are shown in Table 2.

TABLE 2

| Classification | Basis weight (g/m$^2$) | Ventilation (1/min@ 300 Pa) | Average sound absorption coefficient | |
|---|---|---|---|---|
| | | | Low frequency (200~2000 Hz) | High frequency (500~6300 Hz) |
| Example 1 | 1200 | 7 | 0.18 | 0.18 |
| Example 2 | 1000 | 16 | 0.15 | 0.16 |
| Example 3 | 1600 | 3 | 0.20 | 0.12 |

In Table 2, Examples 1-3 were all manufactured by the board of the same thickness and was manufactured by changing the basis weight, and thus, as the basis weight is increased, the density is increased. As the basis weight is increased, the density of the board is increased, and the surface area is increased, and, as the surface area is increased, the sound absorption effect by the vibration of the board is increased and showed the Resonance frequency in the low frequency area, and thus, it was found that it showed high sound absorption coefficient at low frequency despite of the low ventilation property.

On the other hand, in the high frequency area, the sound absorption effect was shown by the vibration of the fiber, and, in Example 1, the sound absorption effect by the vibration of the fiber was excellent and the high frequency sound absorption performance was highly excellent. In case of Example 3, as the fiber was included with compressed with the high density and the porosity was lowered, and thus, the sound absorption effect by PET fiber was lowered to show the low sound absorption coefficient. On the other hand, although it is advantageous in the sound absorption performance aspect by the vibration of the fiber since the compressed degree of the fiber of Example 2 is lower than that of Example 1, the content of the fiber is lowered and the high frequency sound absorption performance of Example 2 is more inferior than Example 1. Therefore, it can be understood that the high frequency sound absorption performance has to adjust the appropriate content and the porosity of the fiber.

Figure 5:
FIG. 5 is an optical microscope image of the surface of the board manufactured in Example 1.
Figure 6:
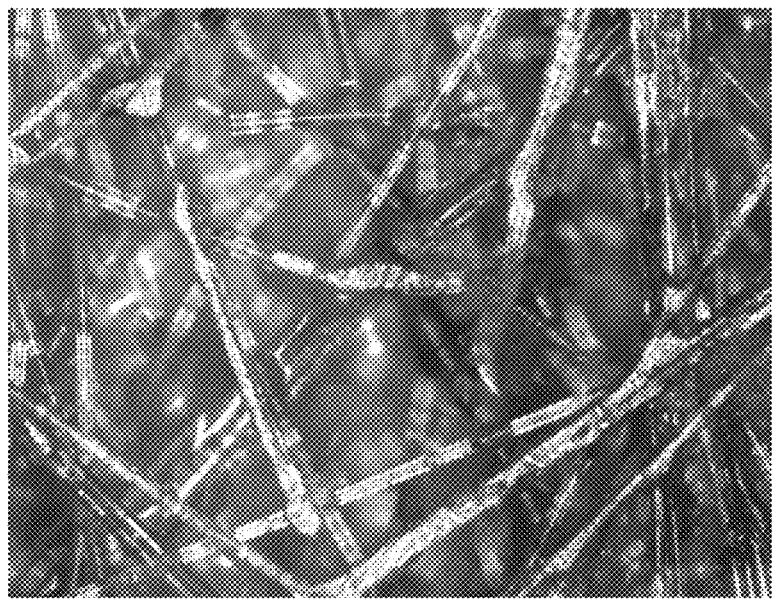
FIG. 6 is an optical microscope image of the surface of the board manufactured in Example 2.
Figure 7:
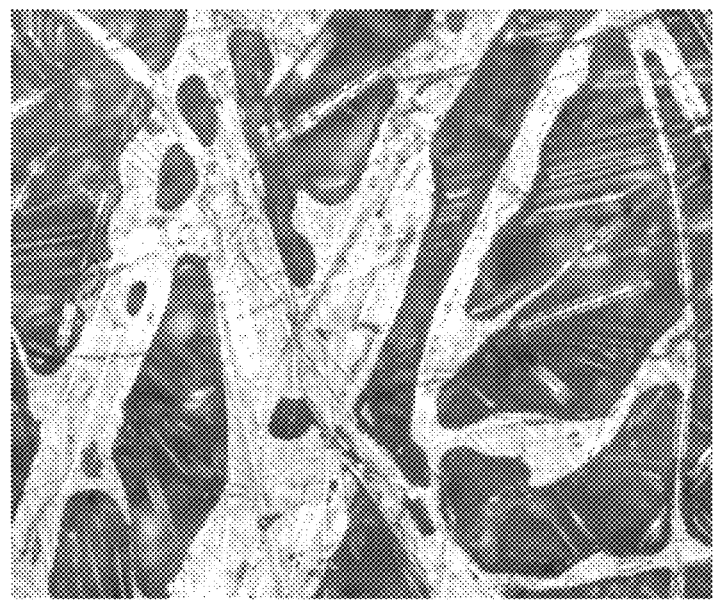
FIG. 7 is an optical microscope image of the surface of the board manufactured in Example 3.

FIG. 5 is an optical microscope image of the surface of the board manufactured in Example 1, and, FIG. 6 is an optical microscope image of the surface of the board manufactured in Example 2, and FIG. 7 is an optical microscope image of the surface of the board manufactured in Example 3. FIG. 6 of Example 2 which is lowest in basis weight, FIG. 5 of Example 1, and FIG. 7 of Example 3 which is highest in basis weight, in the order, it was confirmed that the sheath part of the bicomponent fiber was melted, and, when forming the binder in the board, it was well aggregated, and filmed to form the surface smoothly. On the other hand, when the board is formed as the same structure as the film, as the pore-closed structure was formed, the sound absorption performance was lowered. Example 2 which formed the open pores most, nevertheless, the content of the fiber was lowered and the sound absorption performance was lowered compared to Example 1.

Experimental Example 4

With regard to the boards of Examples 1 and 3 to 6, the flexural strength (the pressure required for breaking the material) and the flexural rigidity (the force required for a certain degree of the material modification) were evaluated. According to ASTM D790, the three-point flexural strength and the flexural rigidity were measured and are shown in Table 3.

TABLE 3

| Classification | Flexural strength (MPa) | Flexural rigidity (N/mm) |
|---|---|---|
| Example 1 | 35 | 0.35 |
| Example 3 | 50 | 0.43 |
| Example 4 | 40 | 0.17 |
| Example 5 | 28 | 0.70 |
| Example 6 | 12 | 1.20 |

As the compression rate is increased, the ratio which the pore takes in the inside of the material is decreased and the flexural strength is improved; however, the thickness of the material is decreased, and thus, when the constant force was applied, the property of bending of the board was increased, the flexural strength and the flexural rigidity have the trade-off property each other. Therefore, it is necessary to mold it with the thickness in the suitable range, according to the use.

In Example 3, when the density of the board was increased, the content of the reinforced fiber itself was increased, and thus, the flexural strength and the flexural rigidity were all increased.

However, in case of comparing the composite sheet manufactured with the same density, by only varying the compression rate, the flexural strength and the flexural rigidity showed the different tendency. Although the compression rate of Example 4 was increased compared to Example 1 and the flexural strength was improved, it was confirmed that the flexural rigidity was largely reduced. On the other hand, in Example 5, the compression rate was reduced compared to Example 1 and the flexural strength was reduced, it was confirmed that the flexural rigidity was improved by about 2 times. As the case of Example 6, when the compression rate was largely reduced, it was confirmed that the flexural rigidity was increased; however, the flexural strength was largely reduced. It was confirmed that the flexural strength and the flexural rigidity had the inversely proportional relationship each other.

When the porous single resin fiber composite material is applied to the automobiles or the building materials, the breaking of the material should not be generated by the force applied from outside and the modification of the material should not be generated to some extent. When the board is manufactured to be suitable for the specific use, it can be seen that the optimal mechanical property balance may be exhibited by molding it to have the appropriate compression rate (or the porosity).

For example, in applying it as the automobiles or the building material, the porous single resin fiber composite material may be the range having the property of the flexural strength and the flexural rigidity which 80 to 95% of the compression rate and 40 to 80% of the porosity (based on the volume ratio) are appropriate.

Experimental Example 5 After manufacturing the sample in the size of 200 mm (width)×200 mm (length)×2 mm (thickness) with regard to the board of Example 1 and Comparative Examples 1 and 2, the thermal conductivity was measured.

The measurement results are shown in Table 4 below.

TABLE 4

| Classification | Thermal conductivity (W/mK) |
| --- | --- |
| Example 1 | 0.03 |
| Comparative Example 1 | 0.035 |
| Comparative Example 2 | 0.035 |

In Table 4, as in Example 1, in case of the composite material composed of the polymer fiber only, it showed the low thermal conductivity compared to Comparative Example 1 which is the composite material by applying the glass fiber as the reinforced fiber, and thus, it was confirmed that the thermal insulation performance was excellent. This is because the thermal conductivity effect through the polymer fiber is low compared to the thermal conductivity effect through the glass fiber.

When the glass fiber and the polymer fiber were both applied, as in Example 1, and, compared to Example 1, although the polymer fiber was partially applied, the thermal conductivity was not reduced. This is because, in Example 2, the dispersibility of the fiber was decreased, and the porosity was reduced, and thus, the direct thermal conductivity through the fiber was increased. Therefore, the board of Example 1 may expect the excellent thermal insulation effect and it is suitable for applying it as the automobiles or the building materials.

While the preferred embodiments of the present invention has been described in detail hereinabove, the scope of the present invention is not limited thereto and many modification and variation forms using the basic concept of the present invention defined in the following claims by those skilled in the art also fall within the scope of the present invention.

EXPLANATION OF REFERENCE NUMERALS

1: First fibrous particle
2: Second fibrous particle
3: Binder
4: Reinforced fiber
5: Bicomponent polymer fiber
5a: Core part
5b: Sheath part
10, 20: Porous single resin fiber composite material

The invention claimed is:

1. A porous single resin fiber composite material comprising:
   a first fibrous particle; and
   a bicomponent polymer fiber comprising:
      a core comprising a second fibrous particle; and
      a sheath comprising a binder, wherein the binder binds the first fibrous particle and the second fibrous particle,
   wherein the first fibrous particle and the second fibrous particle are bound by the binder so as to form a random network structure comprising pores,
   wherein the first fibrous particle is a polyester-based fiber comprising a first polyester-based resin, and the first fibrous particle is a stretched polyester-based fiber having an elongation rate ranging from 300% to 600%,
   wherein the second fibrous particle is a polyester-based fiber comprising a second polyester-based resin, and the second fibrous particle is an unstretched polyester-based fiber having an elongation rate of 0% or a stretched polyester-based fiber having an elongation rate of less than 300%,
   wherein the binder comprises a third polyester-based resin,
   wherein a melting point of the second polyester-based resin is higher than the melting point of the third polyester-based resin,
   wherein a weight ratio between the first fibrous particle and a sum of the second fibrous particle and the binder ranges from 25:75 to 40:60,
   wherein the porous single resin fiber composite material is a board having a basis weight ranging from 600 g/m$^2$ to 3000 g/m$^2$,
   wherein a density of the porous single resin fiber composite material ranges from 0.2 g/cm$^3$ to 1.6 g/cm$^3$, and
   wherein a porosity of the porous single resin fiber composite material ranges from 40% by volume to 80% by volume.

2. The porous single resin fiber composite material according to claim 1, wherein the first fibrous particle and the second fibrous particle are partially or entirely coated with the binder on surfaces of the respective particles to form a coating part, and the coating part formed on the respective surface are fused and bound to each other.

3. The porous single resin fiber composite material according to claim 1, wherein a weight of the binder is 40 parts by weight to 250 parts by weight based on 100 parts by weight of the second fibrous particle.

4. The porous single resin fiber composite material according to claim 1, wherein the second polyester-based resin has a specific gravity of greater than 1.

5. The porous single resin fiber composite material according to claim 1, wherein the second polyester-based resin has a melting point of 160° C. or more.

6. The porous single resin fiber composite material according to claim 1, wherein the third polyester-based resin has a melting point of less than 200° C.

7. The porous single resin fiber composite material according to claim 1, wherein the third polyester-based resin is low melting point polyethylene terephthalate, in which more than 0 to 50 mol % of the phthalate unit has been substituted with one selected from the group consisting a phthalic unit, an isophthalic unit, and a combination thereof.

8. The porous single resin fiber composite material according to claim 1, wherein the first fibrous particle has a length of 6 mm to 24 mm.

9. The porous single resin fiber composite material according to claim 1, wherein the second fibrous particle has the length of 3 mm to 6 mm.

10. The porous single resin fiber composite material according to claim 1, wherein the board has a thickness of 2 mm to 8 mm.

* * * * *